US012025234B2

(12) United States Patent
Fangmeier

(10) Patent No.: US 12,025,234 B2
(45) Date of Patent: Jul. 2, 2024

(54) PRESSURE-REDUCING VALVE

(71) Applicant: Neoperl GmbH, Mullheim (DE)

(72) Inventor: Martin Fangmeier, Auggen (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 17/434,073

(22) PCT Filed: Feb. 4, 2020

(86) PCT No.: PCT/EP2020/052656
§ 371 (c)(1),
(2) Date: Aug. 26, 2021

(87) PCT Pub. No.: WO2020/177961
PCT Pub. Date: Sep. 10, 2020

(65) Prior Publication Data
US 2022/0136613 A1    May 5, 2022

(30) Foreign Application Priority Data
Mar. 1, 2019 (DE) .......................... 202019101183.1

(51) Int. Cl.
F16K 17/30 (2006.01)
G05D 16/10 (2006.01)
(52) U.S. Cl.
CPC .......... F16K 17/30 (2013.01); G05D 16/106 (2013.01)
(58) Field of Classification Search
CPC .......... F16K 17/30; G05D 16/106; F16J 9/20
(Continued)

(56) References Cited

U.S. PATENT DOCUMENTS 2,387,854 A * 10/1945 Phillips ...................... F16J 9/20
277/460
3,347,261 A * 10/1967 Yancey ................... F16K 3/207
137/246.22
(Continued)

FOREIGN PATENT DOCUMENTS

CN      208138531 U    11/2018
EP         1482389     12/2004
(Continued)

OTHER PUBLICATIONS

German language Office Action dated Dec. 5, 2022 in related German application No. 10 2019 105 325.0.

*Primary Examiner* — Jessica Cahill
(74) *Attorney, Agent, or Firm* — Volpe Koenig

(57) ABSTRACT

A pressure reducing valve with a valve housing, with a valve carrier in the housing interior having a throughflow channel, and with a cup-shaped valve body displaceably guided from an open position into a closed position counter to a restoring force, where the valve body abuts a valve seat on the valve carrier formed as a sealing ring, closing a channel opening. The sealing ring is held in an annular groove of the valve carrier and is axially supported by the groove flanks. The groove flank which faces the valve body ends in front of the inner circumference thereof, which abuts the sealing ring when the pressure reducing valve is closed. A sealing-lip-like circumferential molded-on formation is molded on that end face of the sealing ring which faces the valve body, and this formation moves against the inner circumference of the valve body when the primary pressure on the inlet side of the valve rises.

13 Claims, 2 Drawing Sheets

(58) Field of Classification Search
USPC .................................................. 137/315.32
See application file for complete search history.

(56) References Cited

U.S. PATENT DOCUMENTS

| | | | | |
|---|---|---|---|---|
| 4,512,359 | A * | 4/1985 | Hinojosa | F16K 3/0227 |
| | | | | 251/266 |
| 4,681,326 | A * | 7/1987 | Kubo | F16J 1/08 |
| | | | | 277/447 |
| 5,396,918 | A | 3/1995 | Parker | |
| 10,296,019 | B2 | 5/2019 | Fangmeier | |
| 11,085,315 | B2 * | 8/2021 | Gallier | F16J 15/164 |
| 2005/0126636 | A1 * | 6/2005 | Matsui | G05D 16/106 |
| | | | | 137/505 |
| 2016/0357198 | A1 * | 12/2016 | Fangmeier | F16K 1/126 |
| 2017/0130840 | A1 * | 5/2017 | Mittler | F16J 9/20 |
| 2018/0306120 | A1 * | 10/2018 | Shi | F23R 3/60 |

FOREIGN PATENT DOCUMENTS

| | | |
|---|---|---|
| EP | 1482398 A1 | 12/2004 |
| JP | S6262065 | 3/1987 |
| WO | 2015161905 | 10/2015 |

* cited by examiner

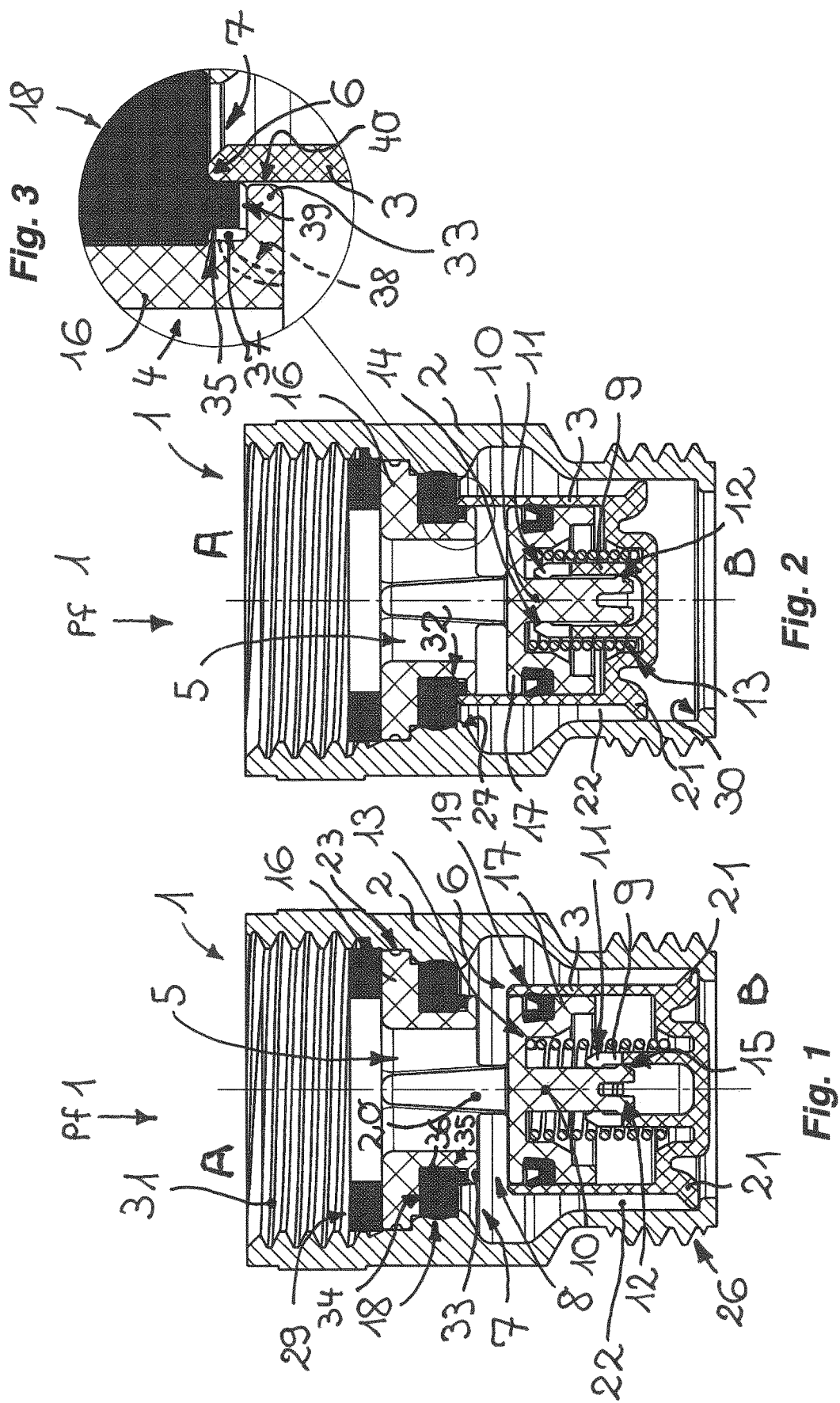

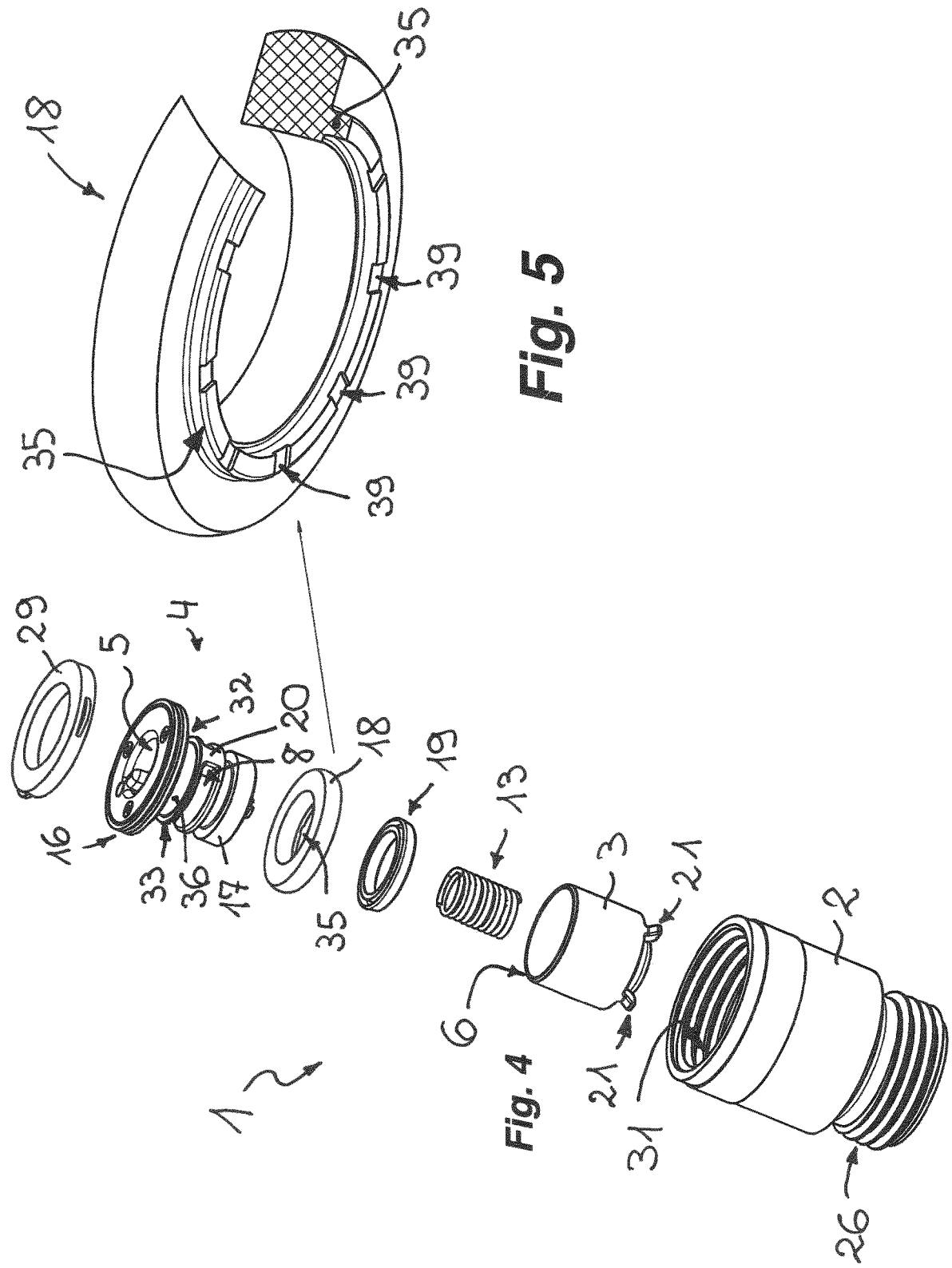

PRESSURE-REDUCING VALVE

TECHNICAL FIELD

The invention relates to a pressure reducing valve with a valve housing, provided in the housing interior space of which is a valve carrier, which has at least one throughflow channel, and with a cup-shaped valve body which is displaceably guided from an open position into a closed position counter to a restoring force, in which closed position the valve body with the circumferential edge of its cup shape abuts a valve seat, which is provided on the valve carrier and is in the form of a sealing ring, in such a way that the valve body closes at least one channel opening in the at least one throughflow channel.

BACKGROUND

A pressure reducing valve of the type mentioned in the introduction, which is intended to limit the water pressure in the line section located downstream of the pressure reducing valve to a specified maximum value and to prevent bursting in the region of this line section located downstream due to a pressure increase that exceeds the maximum value, is already known from WO 2015/161905. For this purpose, the previously known pressure reducing valve has a valve housing that can be inserted or interposed in a fluid line. A cup-shaped valve body is provided in the housing interior space of the valve housing. The previously known pressure reducing valve has a valve carrier, in which at least one throughflow channel is provided. If the line cross section narrows in the line section located downstream and the water pressure continues to rise there, the displaceably guided valve body is moved under the effect of the pressure of the medium that flows through from an open position into a closed position counter to a restoring force, in which closed position the valve body with the circumferential edge of its cup shape abuts a valve seat, which is provided on the valve carrier and is formed by a sealing ring, in such a way that the valve body closes at least one channel opening in the at least one throughflow channel. Since the valve body is increasingly pressed in the direction toward the valve carrier counter to the restoring force of the at least one restoring element when the water pressure rises in the line section located upstream of the pressure reducing valve, and as a result the pressure loss rises at the channel opening, which thus becomes smaller, the pressure of the fluid in the line section located downstream of the pressure reducing valve is delimited to a specified maximum value. However, if such a previously known pressure reducing valve is connected upstream of an on/off valve or shut-off valve, when the pressure reducing valve is in the closed position some of the primary water pressure prevailing upstream of the pressure reducing valve can creep through the pressure reducing valve and allow the static pressure in the region between the pressure reducing valve and the on/off valve which is downstream in the direction of flow to rise in such a way that the pressurized application provided downstream bursts.

SUMMARY

In particular, there is thus the objective of providing a pressure reducing valve of the type mentioned in the introduction, which in its closed position counteracts an increase in the static pressure in the region between the pressure reducing valve and an application located downstream and effectively prevents bursting in the region of this line section as a result of an excessive rise in pressure.

In the case of the pressure reducing valve of the type mentioned in the introduction, the solution according to the invention to meeting this objective is in particular that the sealing ring is held in an annular groove of the valve carrier that is open on the outer circumference and is axially supported on either side by the groove flanks of the annular groove, that the groove flank which faces the valve body ends in front of the inner circumference of the valve body, which abuts the sealing ring when the pressure reducing valve is in the closed position, that a sealing-lip-like circumferential molded-on formation is molded on that end face of the sealing ring which faces the valve body, and that this sealing-lip-like molded-on formation can come to lie against the inner circumference of the valve body in the closed position of the pressure reducing valve when the pressure prevailing on the inlet side of the pressure reducing valve rises.

The pressure reducing valve according to the invention has a valve housing, which can be inserted or interposed in a fluid line in order to delimit the water pressure in the line section located downstream of the pressure reducing valve to a specified maximum value. The sealing ring which forms the valve seat is held in an annular groove, which is open on the outer circumference, of the valve carrier and is axially supported on either side by the groove flanks of the annular groove. In this respect, the groove flank which faces the valve body ends in front of the inner circumference of the valve body, which abuts the sealing ring when the pressure reducing valve is in the closed position. A sealing-lip-like, circumferential molded-on formation is molded on that end face of the sealing ring which faces the valve body. When the pressure reducing valve is in the closed position, this sealing-lip-like molded-on formation comes to lie tightly against the inner circumference of the valve body when the primary pressure prevailing on the inlet side of the pressure reducing valve rises. Since the sealing ring is axially supported on either side by the groove flanks of the annular groove, any deformation of the sealing ring that is caused by suction is counteracted. When the pressure reducing valve is in the closed position, sealing-lip-like molded-on formation also prevents the sealing-lip-like molded-on formation in this way an undesirable rise in pressure on the outlet side of the pressure reducing valve.

In order that the primary pressure prevailing on the inlet side of the pressure reducing valve can cause the sealing-lip-like molded-on formation on the sealing ring to come to lie tightly against the inner circumference of the cup-shaped valve body when the pressure reducing valve is in the closed position, it is advantageous when an annular space, which communicates with the inlet side of the pressure reducing valve, is provided between a groove base of the annular groove and the sealing-lip-like molded-on formation.

In this respect, one expedient embodiment according to the invention provides that at least one pressure equalizing channel, which connects the inlet side of the pressure reducing valve to the annular space, is provided in the region of the annular groove.

A particularly simple and advantageous embodiment according to the invention provides that at least one depression or indentation is provided on that face edge of the sealing-lip-like molded-on formation which faces the valve carrier, which at least one depression or indentation connects the annular space to an annular gap, which is provided between the valve carrier and the valve body when the pressure reducing valve is in the closed position, in a fluid-carrying manner.

In order that the primary pressure from the inlet side of the pressure reducing valve can readily reach the annular space between the sealing-lip-like molded-on formation and the valve carrier, it is advantageous if that face edge of the sealing-lip-like molded-on formation which faces the valve carrier has a crown-shaped form and has depressions which are spaced apart from one another.

The restoring element serving as the restoring force may be a rubber-elastic component, for example. A particularly simple and expedient embodiment according to the invention provides, however, that the at least one restoring element serving as the restoring force is a helical compression spring.

In order that the valve body can be safely and displaceably guided on the valve carrier in a functionally reliable manner, it is advantageous if the valve carrier has a valve carrier portion that abuts the housing inner circumference of the valve housing in an axially fixed manner and/or in a manner centered in relation to the inner circumference of the housing. In this respect, one preferred embodiment according to the invention provides that the valve carrier portion of the valve carrier has a plate-shaped form.

In order that the valve body can be pushed and pressed increasingly onto the valve carrier as the pressure of the fluid rises, it is advantageous if the valve carrier has a guide portion, on which guide portion the cup-shaped valve body is displaceably guided with its valve body inner circumference.

BRIEF DESCRIPTION OF THE DRAWINGS

Refinements according to the invention become apparent from the figures in conjunction with the description and the claims. The invention is described in yet more detail below with reference to a preferred exemplary embodiment.

In detail:

FIG. 1 shows a longitudinally sectional illustration of a pressure reducing valve with a valve housing, in the housing interior space of which a cup-shaped valve body is displaceably guided on a valve carrier, wherein here the valve body is in an open position of the pressure reducing valve, FIG. 2 shows the pressure reducing valve from FIG. 1 in its closed position, in which the valve body with its circumferential face edge abuts a sealing ring, which serves as a valve seat and is arranged in an annular groove of the valve carrier, FIG. 3 shows the pressure reducing valve from FIGS. 1 and 2 in its closed position in a detailed longitudinal section in the partial region which is defined in FIG. 2, FIG. 4 shows the pressure reducing valve from FIGS. 1 to 3 in a pulled-apart perspective illustration of its constituent parts, and FIG. 5 shows the sealing ring, which serves as the valve seat of the pressure reducing valve, in a perspective bottom view, wherein this sealing ring is illustrated in a partially cut-open manner.

DETAILED DESCRIPTION

FIGS. 1 to 5 illustrate a pressure reducing valve 1, through which the flow passes in the direction of the arrow Pf1, which can be inserted into a water line, for example, and is intended to delimit the water pressure in the line section located downstream of the pressure reducing valve 1 to a specified maximum value. The pressure reducing valve 1 has a valve housing 2, which can be inserted or interposed in a fluid line in order to delimit the water pressure in the line section located downstream of the pressure reducing valve 1 to a specified maximum value. A cup-shaped valve body 3 is arranged in the housing interior space of the valve housing 2. The pressure reducing valve 1 has a valve carrier 4, in which at least one throughflow channel 5 is provided. If the line cross section narrows in the line section located downstream and the water pressure continues to rise there, the displaceably guided valve body 3 is moved under the effect of the pressure of the medium that flows through from the open position, shown in FIG. 1, into the closed position, shown in FIGS. 2 and 3, counter to the restoring force of at least one restoring element, in which closed position the valve body 3 with the circumferential face edge 6 of its cup shape abuts a valve seat 7, which is provided on the valve carrier 4 and is formed by a sealing ring 18, in such a way that the valve body 3 closes at least one channel opening 8 in the at least one throughflow channel 5. Since the valve body 3 is increasingly pressed in the direction toward the valve carrier 4 counter to the restoring force of the at least one restoring element when the water pressure rises in the line section located upstream of the pressure reducing valve 1, and as a result the pressure loss rises at the channel opening 8, which thus becomes smaller, the pressure of the fluid in the line section located downstream of the pressure reducing valve 1 is delimited to a specified maximum value. The sealing ring 18 which forms the valve seat 7 is held in an annular groove 32, which is open on the outer circumference, of the valve carrier 4 and is axially supported on either side by the groove flanks 33, 34 of the annular groove 32. As is clear in particular from the longitudinal section of a detail in FIG. 3, in this respect the groove flank 33 which faces the valve body 3 ends in front of the inner circumference of the valve body 3, which abuts the sealing ring 18 when the pressure reducing valve is in the closed position. A sealing-lip-like, circumferential molded-on formation 35 is molded on that end face of the sealing ring 18 which faces the valve carrier 4. When the pressure reducing valve 1 is in the closed position, this sealing-lip-like molded-on formation 35 comes to lie tightly against the inner circumference of the valve body 3 when the primary pressure prevailing on the inlet side A of the pressure reducing valve 1 rises. Since the sealing ring 18 is axially supported on either side between the groove flanks 33, 34 of the annular groove 32, any deformation of the sealing-lip-like molded-on formation 35 that is caused by suction is counteracted. When the pressure reducing valve 1 is in the closed position, this sealing-lip-like molded-on formation 35, when the pressure reducing valve 1 is in the closed position, comes to lie tightly against the inner circumference of the valve body 3 when the primary pressure prevailing on the inlet side rises, and in this way also prevents an undesirable rise in pressure on the outlet side B of the pressure reducing valve 1. The pressure reducing valve 1 illustrated here can therefore be readily used in particular in such applications in which an on/off valve, for example arranged upstream of a WC shower head, is provided on the outlet side of the pressure reducing valve 1.

It can be clearly seen in FIGS. 1, 2 and 4 that a central holding sleeve 9, into which a holding pin 10 arranged on the valve carrier 4 protrudes, is provided on the inner end face of the cup base of the valve body 3. Provided on the inner circumference of the holding sleeve 9 is a stop 11, which interacts with a counter-stop 12 on the outer circumference of the holding pin 10 in such a way that, when the pressure reducing valve 1 is in the open position, the stop 11 and the counter-stop 12 delimit the displacement travel of the valve body 3 relative to the valve carrier 4. Since the stop 11 and the counter-stop 12 that interacts with it delimit the displacement travel of the valve body 3 relative to the valve carrier 4 in the open position, inadvertent falling-apart of the pressure reducing valve 1 illustrated here during storage, transport or assembly can be counteracted. The valve carrier 4, the valve body 3 and the restoring element which acts between them form, in addition to the associated sealing rings 18, 19, in practice an insert unit which only has to be inserted into the valve housing 2 to complete the pressure reducing valve 1. This considerably simplifies the assembly of the pressure reducing valve 1 illustrated here.

It can be seen in FIGS. 1 and 2 that here the at least one restoring element is in the form of a helical compression spring 13. In this respect, the helical compression spring 13, which serves as a restoring element, engages around the holding pin 10 and the holding sleeve 9. The holding pin 10 and the holding sleeve 9 are aligned coaxially in relation to one another and to the longitudinal axis of the valve housing. It can be seen in FIGS. 1 and 2 that the stop 11 is arranged on the free end-face region of the holding sleeve 9. In order for it to be possible for the displacement travel of the valve body 3, which is displaceably guided on the valve carrier 4, to be dimensioned sufficiently in terms of length, the counter-stop 12 is also arranged on the free end-face region of the holding pin 10. In order not to adversely affect the function of the pressure reducing valve 1, even if the valve body 3 and valve carrier 4 are rotated relative to one another, the stop 11 and the counter-stop 12 are each in the form of a circumferentially encircling or preferably segmented annular flange or annular bead.

Both the stop 11 provided on the inner circumference of the holding sleeve 9 and the counter-stop 12 arranged on the outer circumference of the holding pin 10 have a run-on bevel or run-on flank 14, 15 that tapers toward the free end face of the holding sleeve 9 or holding pin 10, respectively. FIG. 1 illustrates that the stop 11 provided on the holding sleeve 9 and the counter-stop 12 protruding laterally on the holding pin 10 engage behind one another in such a way that the valve body 3 and the valve body 4 are held against one another before assembly in the valve housing 2 of the pressure reducing valve 1.

It is clear from FIG. 4 that the valve carrier 4 has a valve carrier portion 16, which valve carrier portion 16 axially fixedly abuts the housing inner circumference of the valve housing 2 and is immovably held in the housing interior of the valve housing 2 when the pressure reducing valve 1 is in the use position. This valve carrier portion 16 is substantially in the form of a plate.

The valve carrier 4 has a guide portion 17, on which guide portion 17 the valve body 3 is displaceably guided with its valve body inner circumference. This guide portion 17 of the valve carrier 4 comprises the holding sleeve or—as here— the holding pin 10 on its end face which is directed toward the valve body interior space.

In order that the fluid flowing through the pressure reducing valve 1 can only pass through the at least one throughflow channel 5, an annular seal 18, with which this valve body portion 16 tightly abuts the housing inner circumference of the valve housing 2, is provided on the valve body portion 16. An annular seal 19, which seals the inside of the pot-shaped valve body 3 against the fluid flowing through, is also arranged on the guide section 17 of the valve carrier 4. Here, the annular seal 19 tightly abuts the cup inner circumference of the valve body 3. It can be seen from a comparison of FIGS. 1, 2 and 4 that the valve body portion 16 and the guide portion 17 of the valve carrier 4 are connected via a connecting portion 20. The at least one channel opening 8 of the throughflow channel 5 is arranged here on this connecting portion 20. In this respect, the connecting portion 20 is contoured or has a diameter such that the channel opening 8 is closed by the cup inner circumferential wall of the cup-shaped valve body 3 when the pressure reducing valve 1 is in the closed position.

It is clear from a comparison of FIGS. 1, 2 and 4 that provided on the outer circumference of the valve body 3 is at least one sliding element, and here four sliding elements 21 uniformly spaced apart from one another in the circumferential direction, which protrude beyond the valve body 3 in the radial direction in such a way that an annular channel 22 is formed between the inner circumference of the valve housing 2 on the one hand and the outer circumference of the valve body 3 on the other hand. Since the valve body 3 slides only with its laterally protruding sliding elements 21 on the inner circumference of the valve housing 2, the frictional area of the valve body 3 is effectively reduced. When the valve 1 is in the open position, the sliding elements 21 abut an annular shoulder 30 on the inner circumference of the valve housing 2.

It is clear from a comparison of FIGS. 1, 2 and 4 that an annular groove 23 is provided on the outer circumference of the valve body portion 16. This annular groove 23 is connected to the cup interior space of the cup-shaped valve body 3 via at least one ventilation channel. At least one ventilation opening, which opens out into the annular groove 23, is provided in the valve housing 2 of the pressure reducing valve 1. During the displacement movements of the valve body 3, the air trapped in the cup interior space of the cup-shaped valve body 3 can escape via the ventilation channel and the ventilation opening. What is prevented in this way is a possible build-up of an undesirable counter-pressure in the cup interior space of the valve body 3 when the pressure of the outlet-side fluid presses the valve body 3 onto the guide portion 17 of the valve carrier 4.

The valve housing 2 has an internal thread 31 on its inlet side A and a complementary external thread 26 on its outlet side B. The valve housing 2 may for example be screwed with the external thread 26 onto the hose connection of a flexible hose line, in order to protect this flexible hose line from excessive pressure of the fluid and from bursting caused by pressure. If the valve carrier 4 is connected to a water inlet line by way of the internal thread 31 arranged on its inlet side A, the valve carrier 4 is fixedly clamped in between the annular shoulder 27 arranged on the inner circumference of the valve housing 2 and the water inlet line, not illustrated further here, by way of its valve carrier portion 16. In order to ensure that the water that flows through is only able to pass in the region of the at least one throughflow channel 5, the annular seals 18, 29 are provided on either side of the valve carrier portion 16. It is also possible for the pressure reducing valve illustrated here to be interposed between the inlet-side water connection and an on/off valve which is downstream of the pressure reducing valve 1 in the direction of flow, in order to prevent the primary pressure from percolating through the valve seat 17 onto the outlet-side secondary side B of the pressure reducing valve 1 and in order to counteract bursting of the line section provided between the pressure reducing valve 1 and the on/off valve downstream thereof.

It can be seen in FIGS. 1 and 2 that an annular space 37, which communicates with the inlet side of the pressure reducing valve 1, is provided between a groove base 36 of the annular groove 32 and the sealing-lip-like molded-on formation 35 on the sealing ring 18. In order that this annular space 37 can communicate with the inlet side A of the pressure reducing valve 1, it is possible to provide in the region of the annular groove 32 at least one pressure equalization channel 38, which is indicated in FIG. 1 by dashed lines in the region of the groove flank 33 and which communicates with the inlet side of the pressure reducing valve 1.

A preferred embodiment according to the invention, shown by continuous lines in FIGS. 1 to 5, provides however that at least one depression 39 or indentation is provided on that face edge of the sealing-lip-like molded-on formation 35 which faces the valve body 3, which at least one depression or indentation connects the annular space 37 to an annular gap 40, which remains between the valve carrier 4 and the valve body 3 when the pressure reducing valve 1 is in the closed position, in a fluid-carrying manner.

As is clear from the perspective bottom view of the sealing ring 18 shown in FIG. 5, that face edge of the sealing-lip-like molded-on formation 35 which faces the valve body 3 preferably has a crown-shaped form and has a plurality of depressions 39, preferably uniformly spaced apart from one another. Consequently, the primary pressure prevailing on the inlet side A of the pressure reducing valve 1 can percolate through the annular gap 40 and the at least one depression 39 into the annular space 37 in such a way that, when the pressure reducing valve 1 is in the closed position, the sealing-lip-like molded-on formation 35 provided on the sealing ring 18 is pressed elastically, specifically counter to the inherent elasticity of the material used for the molded-on formation 35, against the inner circumference of the cup-shaped valve body 3. This effectively prevents the primary pressure prevailing on the inlet side A of the pressure reducing valve 1 from percolating through the valve seat 7 and onto the outlet-side secondary side B of the pressure reducing valve 1, and prevents bursting, caused by pressure, of the line section arranged on the outlet side B of the pressure reducing valve 1.

LIST OF REFERENCE SIGNS

1 Pressure reducing valve
2 Valve housing
3 Valve body
4 Valve carrier
5 Throughflow channel
6 Circumferential edge
7 Valve seat
8 Channel opening
9 Holding sleeve
10 Holding pins
11 Stop
12 Counter-stop
13 Compression spring
14 Run-on flank
15 Run-on flank
16 Valve carrier portion
17 Guide portion
18 Sealing ring
19 Sealing ring
20 Connecting portion
21 Sliding element
22 Annular channel
23 Annular groove
26 External thread
27 Annular shoulder
29 Annular seal
30 Annular shoulder
31 Internal thread
32 Annular groove
33 Groove flank
34 Groove flank
35 Sealing-lip-like molded-on formation
36 Groove base
37 Annular space
38 Pressure equalization channel
39 Depression
40 Annular gap
A Inlet side
B Outlet side

The invention claimed is:

1. A water pressure reducing valve (1), for water pressure regulation in water pipes, the valve (1) comprising: a valve housing (2), configured to be inserted in a water pipe, a valve carrier (4) provided in a housing interior space of the valve housing, the valve carrier (4) has at least one throughflow channel (5), a cup-shaped valve body (3) which is displaceably guided from an open position into a closed position counter to a restoring force, the valve body (3) has a circumferential edge (6) formed by the cup shape that abuts a valve seat (7), provided on the valve carrier (4), in the closed position, with the valve seat being formed as a sealing ring (18), such that the valve body (3) closes at least one channel opening (8) in the at least one throughflow channel (5), the sealing ring (18) is held in an annular groove (32) on the valve carrier, which is open on an outer circumference of the valve carrier (4) and is axially supported on either side by groove flanks (33, 34) of the annular groove (32), the groove flank (33) which faces the valve body (3) ends in front of an inner circumference of the valve body (4), which abuts the sealing ring (18) when the pressure reducing valve (1) is in the closed position, a sealing-lip-shaped circumferential molded-on formation (35) is molded on an end face of the sealing ring (18) which faces the valve body (3), and the sealing-lip-shaped molded-on formation (35) is movable to lie against an inner circumference of the valve body (3) when a primary pressure prevailing on an inlet side (A) of the pressure reducing valve (1) rises, and an annular space (37), which communicates with the inlet side (A) of the pressure reducing valve (1) via a pressure equalization path extending from the annular space (37) to an interior of the valve body (3), located between a groove base (36) of the annular groove (32) and the sealing-lip-shaped molded-on formation (35).

2. The pressure reducing valve according to claim 1, wherein the pressure equalization path comprises at least one pressure equalization channel (38), which connects the inlet side of the pressure reducing valve (1) to the annular space (37), located in a region of the annular groove (32).

3. The pressure reducing valve according to claim 1, wherein the pressure equalization path comprises at least one depression (39) or indentation on a face edge of the sealing-lip-shaped molded-on formation (35) which faces the valve body (3), said at least one depression or indentation connects the annular space (37) to an annular gap (40), which is arranged between the valve carrier (4) and the valve body (3) when the pressure reducing valve (1) is in the closed position, in a fluid-carrying manner.

4. The pressure reducing valve according to claim 3, wherein the face edge of the sealing-lip-shaped molded-on formation (35) which faces the valve body (3) has a crown-shaped form and has the depressions (39) which are spaced apart from one another.

5. The pressure reducing valve according to claim 1, wherein the valve body (3) comprises at least one restoring element in the form of a helical compression spring (13).

6. The pressure reducing valve according to claim 1, wherein the valve carrier (4) has a valve carrier portion (16), and the valve carrier portion (16) axially fixedly abuts an inner circumference of the valve housing (2).

7. The pressure reducing valve according to claim 6, wherein the valve carrier portion (16) of the valve carrier (4) is in the form of a plate.

8. The pressure reducing valve according to claim 6, wherein the annular groove (32) is provided on the valve carrier portion (16).

9. The pressure reducing valve according to claim 6, wherein the annular groove (32) is provided on the valve carrier portion (16).

10. The pressure reducing valve according to claim 1, wherein the valve carrier (4) has a guide portion (17), and the cup-shaped valve body (3) is displaceably guided with the valve body inner circumference on the guide portion (17).

11. The pressure reducing valve according to claim 10, wherein the valve carrier (4) has a valve carrier portion (16), the valve carrier portion (16) axially fixedly abuts an inner circumference of the valve housing (2), and the valve carrier portion (16) and the guide portion (17) of the valve carrier (4) are connected via a connecting portion (20).

12. The pressure reducing valve according to claim 11, wherein the at least one channel opening (8) in the at least one throughflow channel (5) is provided on the connecting portion (20).

13. The pressure reducing valve according to claim 1, wherein the sealing ring (18) is produced from an elastic material at least in a region of its sealing-lip-shaped molded-on formation (35), and the sealing-lip-shaped molded-on formation (35) is elastically pressed against the valve body (3) when the pressure reducing valve (1) is in the closed position.

\* \* \* \* \*